(12) United States Patent
Du et al.

(10) Patent No.: US 11,437,838 B2
(45) Date of Patent: Sep. 6, 2022

(54) BATTERY CHARGING CONTROL METHOD AND APPARATUS, BATTERY MANAGEMENT SYSTEM, AND MEDIUM

(71) Applicant: Contemporary Amperex Technology Co., Limited, Ningde (CN)

(72) Inventors: Mingshu Du, Ningde (CN); Shichao Li, Ningde (CN); Weiqing Wu, Ningde (CN); Wei Zhang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/565,462

(22) Filed: Dec. 30, 2021

(65) Prior Publication Data
US 2022/0123578 A1    Apr. 21, 2022

Related U.S. Application Data

(63) Continuation of application No. PCT/CN2020/132901, filed on Nov. 30, 2020.

(30) Foreign Application Priority Data

Apr. 23, 2020    (CN) .......................... 202010328925.4

(51) Int. Cl.
*H02J 7/00* (2006.01)
*B60L 58/16* (2019.01)
(Continued)

(52) U.S. Cl.
CPC ........ *H02J 7/007182* (2020.01); *B60L 53/62* (2019.02); *B60L 58/12* (2019.02);
(Continued)

(58) Field of Classification Search
CPC .... H02J 7/007182; H02J 7/0048; H02J 7/005; B60L 53/62; B60L 58/12; B60L 58/16
(Continued)

(56) References Cited

U.S. PATENT DOCUMENTS 5,515,087 A *    5/1996    Lim ....................... B41J 2/0457
                                                            347/19
5,734,099 A *    3/1998    Saigo .................... G01R 31/367
                                                            701/22
(Continued)

FOREIGN PATENT DOCUMENTS

CN    101752892 A    6/2010
CN    103730702 A    4/2014
(Continued)

OTHER PUBLICATIONS

EIC-Stic 2800 Search Report for 17565492, Eileen Patton, Apr. 21, 2022 (Year: 2022).*
(Continued)

*Primary Examiner* — John T Trischler
(74) *Attorney, Agent, or Firm* — Law Offices of Liaoteng Wang

(57) ABSTRACT

The present application provides a battery charging control method and apparatus, a battery management system, and a medium. The method includes: obtaining, based on a received charging request, a threshold value and an initial value of a charging parameter of a battery, wherein the threshold value of the charging parameter is determined based on an actual capacity value of the battery and an accumulated mileage of an electric vehicle where the battery is located; sending, under a condition that the initial value of the charging parameter is less than the threshold value of the charging parameter, a control command of charging the battery, so as to charge the battery; obtaining a value of the charging parameter of the battery in real time during the charging of the battery; sending a control command of stopping charging the battery, so as to stop charging.

13 Claims, 2 Drawing Sheets

(51) Int. Cl.
  *B60L 58/12* (2019.01)
  *B60L 53/62* (2019.01)
(52) U.S. Cl.
  CPC .............. *B60L 58/16* (2019.02); *H02J 7/005* (2020.01); *H02J 7/0048* (2020.01)
(58) Field of Classification Search
  USPC ........................................................ 320/134
  See application file for complete search history.

(56) References Cited

U.S. PATENT DOCUMENTS

| | | | | |
|---|---|---|---|---|
| 8,198,862 | B2* | 6/2012 | Zhang | H02J 7/0018 |
| | | | | 320/118 |
| 8,332,096 | B2* | 12/2012 | Riegelman | B60W 50/0097 |
| | | | | 701/34.4 |
| 8,521,408 | B2* | 8/2013 | Cho | B60L 58/12 |
| | | | | 701/123 |
| 8,536,825 | B2* | 9/2013 | Kishiyama | H02J 7/0071 |
| | | | | 180/65.29 |
| 9,991,725 | B2* | 6/2018 | Song | H02J 7/342 |
| 10,005,372 | B2* | 6/2018 | Lee | H01M 10/48 |
| 10,236,701 | B2* | 3/2019 | Song | H02J 7/342 |
| 10,256,647 | B2* | 4/2019 | Song | H02J 7/342 |
| 10,330,737 | B2* | 6/2019 | Kim | G01R 31/367 |
| 10,343,673 | B2* | 7/2019 | Liu | B60L 50/61 |
| 10,538,161 | B2* | 1/2020 | You | G01C 21/3697 |
| 10,755,204 | B2* | 8/2020 | Cho | G06Q 50/30 |
| 10,780,795 | B2* | 9/2020 | Zuo | H01M 10/6567 |
| 10,871,521 | B2* | 12/2020 | Ruan | G01R 31/374 |
| 10,910,860 | B2* | 2/2021 | Fu | H02J 7/007188 |
| 10,938,628 | B2* | 3/2021 | Dan | H04L 41/0668 |
| 10,989,759 | B1* | 4/2021 | Du | H02J 7/0048 |
| 11,108,247 | B2* | 8/2021 | Li | H02J 7/0014 |
| 11,152,656 | B1* | 10/2021 | Huang | H01M 10/48 |
| 11,152,799 | B2* | 10/2021 | Schaffer | B60L 58/12 |
| 11,231,467 | B2* | 1/2022 | Du | H02J 7/0048 |
| 11,251,630 | B2* | 2/2022 | Zhang | H02J 7/0048 |
| 11,269,011 | B2* | 3/2022 | Ruan | G01R 31/367 |
| 11,283,116 | B2* | 3/2022 | Liu | H01M 10/625 |
| 2011/0156641 | A1 | 6/2011 | Kishiyama et al. | |
| 2011/0313610 | A1* | 12/2011 | Riegelman | B60W 40/12 |
| | | | | 701/34.4 |
| 2012/0143435 | A1* | 6/2012 | Cho | B60L 58/12 |
| | | | | 701/439 |
| 2014/0207498 | A1* | 7/2014 | Cho | G06Q 10/02 |
| | | | | 705/5 |
| 2015/0066406 | A1 | 3/2015 | Sun et al. | |
| 2015/0326046 | A1* | 11/2015 | Song | H02J 7/00 |
| | | | | 320/165 |
| 2016/0299197 | A1* | 10/2016 | Kim | B60L 58/10 |
| 2017/0240064 | A1* | 8/2017 | Lee | H01M 10/48 |
| 2017/0326983 | A1* | 11/2017 | You | G01C 21/3469 |
| 2018/0254645 | A1* | 9/2018 | Song | H02J 7/342 |
| 2018/0254646 | A1* | 9/2018 | Song | H02J 7/342 |
| 2018/0370520 | A1* | 12/2018 | Liu | B60W 10/06 |
| 2019/0383637 | A1* | 12/2019 | Teske | G01C 21/3682 |
| 2020/0031363 | A1* | 1/2020 | Xiang | G05D 1/0061 |
| 2020/0083722 | A1* | 3/2020 | Zhang | H02J 7/0013 |
| 2020/0084090 | A1* | 3/2020 | Dan | H02J 7/00032 |
| 2020/0158772 | A1* | 5/2020 | Du | B60L 3/0069 |
| 2020/0207237 | A1* | 7/2020 | Zuo | B60L 50/51 |
| 2020/0317084 | A1* | 10/2020 | Schaffer | B60L 50/60 |
| 2020/0341067 | A1* | 10/2020 | Ruan | H01M 10/425 |
| 2020/0341073 | A1* | 10/2020 | Tang | H01M 10/48 |
| 2020/0371162 | A1* | 11/2020 | Ruan | G01R 31/3648 |
| 2020/0400750 | A1* | 12/2020 | Du | H02J 7/0048 |
| 2021/0036388 | A1* | 2/2021 | Liu | H01M 10/615 |
| 2021/0041503 | A1* | 2/2021 | Ruan | G01R 31/392 |
| 2021/0083484 | A1* | 3/2021 | Li | G01R 31/382 |
| 2021/0116512 | A1* | 4/2021 | Du | G01R 31/367 |
| 2021/0119275 | A1* | 4/2021 | Du | G01R 31/367 |
| 2021/0141028 | A1* | 5/2021 | Du | G01R 31/392 |
| 2021/0144052 | A1* | 5/2021 | Dan | H02J 7/0047 |
| 2021/0146794 | A1* | 5/2021 | Ruan | H02J 7/005 |
| 2021/0208200 | A1* | 7/2021 | Du | H02J 7/0048 |
| 2021/0237609 | A1* | 8/2021 | Zhang | B60L 53/62 |
| 2021/0294336 | A1* | 9/2021 | Maus | B60W 30/095 |
| 2021/0305638 | A1* | 9/2021 | Huang | H01M 10/425 |
| 2021/0325466 | A1* | 10/2021 | Ruan | H02J 7/0047 |
| 2021/0350146 | A1* | 11/2021 | Zhang | G06T 7/215 |
| 2022/0144097 | A1* | 5/2022 | Lee | G01R 31/392 |

FOREIGN PATENT DOCUMENTS

| | | |
|---|---|---|
| CN | 107359376 A | 11/2017 |
| CN | 107379977 A | 11/2017 |
| CN | 108099860 A | 6/2018 |
| CN | 109195828 A | 1/2019 |
| CN | 107359378 B | 8/2019 |
| CN | 110516300 A | 11/2019 |
| CN | 111376790 A * | 7/2020 |
| CN | 113830012 A * | 12/2021 |
| JP | 2020182330 A * | 11/2020 |

OTHER PUBLICATIONS

The International search report for PCT Application No. PCT/CN2020/132901, dated Feb. 25, 2021, 12 pages.
The extended European search report for European Application No. 20920763.8 dated May 9, 2022, 9 pages.

* cited by examiner

BATTERY CHARGING CONTROL METHOD AND APPARATUS, BATTERY MANAGEMENT SYSTEM, AND MEDIUM

CROSS-REFERENCE TO RELATED APPLICATION

This application is a continuation of International Application No. PCT/CN2020/132901 filed on Nov. 30, 2020, which claims priority to Chinese Patent Application No. 202010328925.4 entitled "BATTERY CHARGING CONTROL METHOD AND APPARATUS, BATTERY MANAGEMENT SYSTEM, AND MEDIUM" and filed on Apr. 23, 2020, both of which are incorporated herein by reference in their entireties.

TECHNICAL FIELD

This application relates to the field of new energy, and in particular to a battery charging control method and apparatus, a battery management system, and a medium.

BACKGROUND

Lithium-ion batteries are widely used in fields of electric vehicles and the like due to their advantages of high energy density and cycle performance. However, the lithium-ion batteries have different aging rates under different charging or discharging conditions.

During charging, a potential at a negative electrode of a lithium-ion battery drops. Under a condition that the local potential of the negative electrode continues to be too low, it is likely that lithium ions cannot be diffused and intercalated into the negative electrode in time after obtaining electrons on a surface of the negative electrode, causing lithium dendrites at the negative electrode, which even pierce a separator to cause internal short circuits, thereby exacerbating aging of the battery and even causing safety problems.

After the battery is used for a long time to reach a quality guarantee life or even a design life, battery parameters will change after severe aging, such as increase of impedance and loss of lithium ions, resulting in safety risks such as lithium precipitation and thermal runaway of the battery. Therefore, a charging method is urgently needed to improve use safety of the battery.

SUMMARY

Embodiments of the present application provide a battery charging control method and apparatus, a battery management system, and a medium.

In a first aspect, an embodiment of the present application provides a battery charging control method, including:

obtaining, based on a received charging request, a threshold value and an initial value of a charging parameter of a battery, wherein the threshold value of the charging parameter is determined based on an actual capacity value of the battery and an accumulated mileage of an electric vehicle where the battery is located;

sending, under a condition that the initial value of the charging parameter is less than the threshold value of the charging parameter, a control command of charging the battery, so as to charge the battery;

obtaining a value of the charging parameter of the battery in real time during the charging of the battery; and sending, under a condition that the obtained value of the charging parameter of the battery is greater than or equal to the threshold value of the charging parameter, a control command of stopping charging the battery, so as to stop charging.

In a second aspect, an embodiment of the present application provides a battery charging control apparatus, including:

a first obtaining module configured to obtain, based on a received charging request, a threshold value and an initial value of a charging parameter of a battery, wherein the threshold value of the charging parameter is determined based on an actual capacity value of the battery and an accumulated mileage of an electric vehicle where the battery is located;

a first control command sending module configured to send, under a condition that the initial value of the charging parameter is less than the threshold value of the charging parameter, a control command of charging the battery, so as to charge the battery;

a second obtaining module configured to obtain a value of the charging parameter of the battery in real time during the charging of the battery; and a second control command sending module configured to send, under a condition that the obtained value of the charging parameter of the battery is greater than or equal to the threshold value of the charging parameter, a control command of stopping charging the battery, so as to stop charging.

In a third aspect, an embodiment of the present application provides a battery management system, including: a processor and a memory storing computer program instructions;

wherein the processor, when executes the computer program instructions, implements the battery charging control method according to the embodiment of the present application.

In a fourth aspect, an embodiment of the present application provides a computer storage medium having computer program instructions stored thereon, wherein the computer program instructions, when executed by a processor, implement the battery charging control method according to the embodiment of the present application.

BRIEF DESCRIPTION OF THE DRAWINGS

The drawings required to describe embodiments of the present application are introduced briefly below to illustrate technical solutions of the embodiments of the present application more clearly. Obviously, the drawings described below are only some embodiments of the present application, and other drawings may be obtained by those ordinary skilled in the art from those drawings without any creative work.

DETAILED DESCRIPTION

Figure 1:
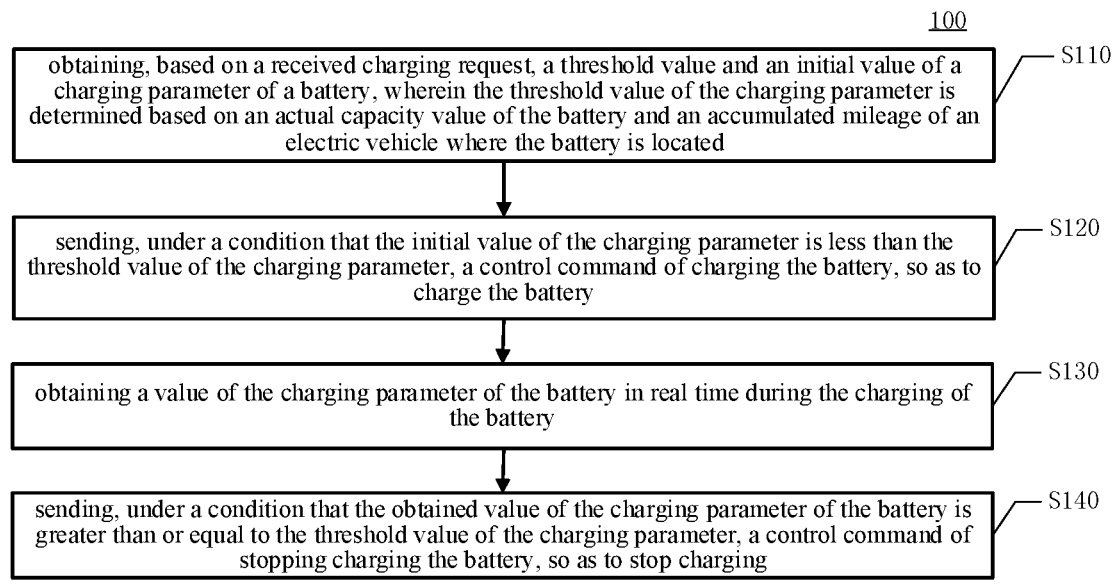
FIG. 1 illustrates a schematic flowchart of an embodiment of a battery charging control method provided according to the present application.

Features and exemplary embodiments of various aspects of the present application will be described in detail below.

In order to make the objects, technical solutions and advantages of the present application clear, the present application will be further described in detail below in conjunction with the drawings and embodiments. It should be understood that the specific embodiments described herein are only configured for explaining the present application, and not configured for limiting the present application. For a person skilled in the art, the present application may be implemented without some of these specific details. The following descriptions of the embodiments are merely to provide a better understanding of the present application by illustrating the examples of the present application.

It should be noted that, in the present application, relational terms, such as first and second, are used merely to distinguish one entity or operation from another entity or operation, without necessarily requiring or implying any actual such relationships or orders of these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

At present, during charging of a battery, it is usually determined whether to stop charging the battery according to whether a charging parameter reaches a preset fixed upper limit. When an electric vehicle is in overdue service, under a condition that whether to stop charging the battery is still determined using the fixed upper limit of the charging parameter, safety risks such as overcharge or thermal runaway may occur.

Based on this, an embodiment of the present application provides a battery charging control method, and the battery charging control method dynamically determine a threshold value of a charging parameter of a battery based on an actual capacity value of the battery and an accumulated mileage of an electric vehicle where the battery is located, which implement dynamic calculation of the threshold value of the charging parameter according to an aging state of the battery. During charging of the battery, under a condition that the obtained value of the charging parameter of the battery is greater than the latest calculated threshold value of the charging parameter, the charging of the battery is stopped. By determining the threshold value of the charging parameter of the battery in consideration with the aging state of the battery, overcharge or thermal runaway and the like occurring in the aging state of the battery can be prevented, and the use safety of the battery can be improved.

FIG. 1 shows a schematic flowchart of a battery charging control method 100 provided according to an embodiment of the present application. As shown in FIG. 1, a battery charging control method 100 includes the following step S110.

In S110, a threshold value and an initial value of a charging parameter of a battery are obtained based on a received charging request. The threshold value of the charging parameter is determined based on an actual capacity value of the battery and an accumulated mileage of an electric vehicle where the battery is located.

In some embodiments of the present application, the actual capacity value of the battery is a parameter used to characterize an aging state of the battery. In some embodiments, the actual capacity value of the battery can be determined based on an accumulated charge/discharge capacity value of the battery.

As an example, the accumulated charge/discharge capacity value of the battery may be any one of a sum of an accumulated charge capacity value of the battery per charge and an accumulated recharge capacity of the battery, an accumulated discharge capacity value of the battery per discharge, and a sum of the accumulated charge capacity value of the battery per charge and the accumulated discharge capacity value of the battery per discharge. The charge capacity of the battery refers to a capacity value charged to the battery that is measured under a specified condition, and the discharge capacity of the battery refers to a capacity value outputted by the battery that is measured under a specified condition.

In some embodiments of the present application, in order to improve the accuracy of accumulating the accumulated charge/discharge capacity value of the battery, the accumulated charge/discharge capacity value of the battery may also be any one of an accumulated converted charge capacity value of a battery cell, an accumulated converted discharge capacity value of the battery cell, and a sum of the accumulated converted charge capacity value of the battery cell and the accumulated converted discharge capacity value of the battery cell. A conversion coefficient corresponding to a charging temperature of the battery is determined based on the charging temperature of the battery and a preset correspondence relationship between a temperature and the conversion coefficient, and a conversion coefficient corresponding to a discharging temperature of the battery is determined based on the discharging temperature of the battery and a preset correspondence relationship between a temperature and the conversion coefficient.

That is, a charging temperature of the battery is obtained during each charging of the battery. Then the charging temperature of the battery is matched with a temperature in the preset correspondence relationship between the temperature and the conversion coefficient, and a conversion coefficient corresponding to the temperature matching the charging temperature of the battery in the correspondence relationship is used as the conversion coefficient corresponding to the charging temperature of the battery.

Similarly, the discharging temperature of the battery is obtained during each discharging of the battery. Then the discharging temperature of the battery is matched with a temperature in the preset correspondence relationship between the temperature and the conversion coefficient, and a conversion coefficient corresponding to the temperature matching the discharging temperature of the battery in the correspondence relationship is used as the conversion coefficient corresponding to the discharging temperature of the battery.

Since the discharging temperature of the battery affects the discharge capacity of the battery, and the charging temperature of the battery affects the charge capacity of the battery, in order to improve the accuracy of accumulating the accumulated charge/discharge capacity value of the battery, the accumulated charge/discharge capacity value of the battery can be calculated using the temperature-converted charge capacity and/or discharge capacity of the battery.

As a specific example, a battery management system can determine the actual capacity value of the battery based on a preset correspondence relationship between a charge/discharge capacity and an actual capacity, and the obtained accumulated charge/discharge capacity value of the battery.

It should be noted that the statistical method of a charge/discharge capacity in a preset correspondence relationship between a charge/discharge capacity and an actual capacity is the same as that of the accumulated charge/discharge capacity value of the battery.

As an example, under a condition that the accumulated charge/discharge capacity value of the battery is the sum of the accumulated charge capacity of the battery per charge and the accumulated recharge capacity, the preset correspondence relationship between the charge/discharge capacity and the actual capacity is a correspondence relationship between a charge capacity and the actual capacity.

Under a condition that the accumulated charge/discharge capacity of the battery is the accumulated discharge capacity value of the battery per discharge, the preset correspondence relationship between the charge/discharge capacity and the actual capacity is a correspondence relationship between a discharge capacity and the actual capacity.

Under a condition that the accumulated charge/discharge capacity value of the battery is the sum of the accumulated discharge capacity value of the battery per discharge and the accumulated charge capacity value of the battery per charge, the preset correspondence relationship between the charge/discharge capacity and the actual capacity is a correspondence relationship between charge and discharge capacities and the actual capacity.

Table 1 shows a schematic diagram of a preset correspondence relationship between a charge/discharge capacity and an actual capacity provided according to an embodiment of the present application.

TABLE 1

| Charge/discharge capacity/Ah | Actual capacity/Ah |
|---|---|
| A1 | D1 |
| A2 | D2 |
| A3 | D3 |
| A4 | D4 |

Where $A_i$ is a different charge/discharge capacity value, $D_i$ is a different actual capacity value, and i is an integer greater than or equal to 1 and less than or equal to 4. It should be noted that the number of charge/discharge capacities in Table 1 is only indicative, and the number of charge/discharge capacities in a first correspondence relationship can be adjusted according to actual requirements.

In the preset correspondence relationship between the charge/discharge capacity and the actual capacity, as the charge/discharge capacity increases, that is, as the number of charge and discharge of the battery increases, the actual capacity presents a decreasing trend. The correspondence relationship in Table 1 can be preset off line according to historically recorded charge/discharge capacity data and the actual capacity value.

In the embodiment of the present application, after obtaining the accumulated charge/discharge capacity value of the battery, the battery management system matches the accumulated charge/discharge capacity value of the battery with each charge/discharge capacity in the preset correspondence relationship between the charge/discharge capacity and the actual capacity, so as to obtain a charge/discharge capacity matching with the accumulated charge/discharge capacity value of the battery in the correspondence relationship, and use an actual capacity corresponding to the charge/discharge capacity as the actual capacity value of the battery.

The actual capacity value of the battery can be quickly obtained using the preset correspondence relationship between the charge/discharge capacity and the actual capacity, which improves the calculation efficiency of the threshold value of the charging parameter.

It should be noted that, when the accumulated charge/discharge capacity value of the battery is calculated using the temperature-converted charge capacity and/or discharge capacity, the charge/discharge capacity in the preset correspondence relationship between the charge/discharge capacity and the actual capacity is also a temperature-converted capacity.

In some embodiments of the present application, the actual capacity value of the battery may also be determined based on the accumulated mileage of the electric vehicle and a preset second correspondence relationship between a mileage and a capacity. For example, the battery management system first matches the accumulated mileage of the electric vehicle with each mileage in the preset second correspondence relationship, to obtain a mileage matching the accumulated mileage of the electric vehicle in the second correspondence relationship. Then the battery management system uses a capacity corresponding to the mileage matching the accumulated mileage of the electric vehicle in the second correspondence relationship as the actual capacity value of the battery. The specific method for obtaining the actual capacity of the battery is not limited here.

In the embodiment of the present application, the battery charging control method can be applied to a battery management system. Under a condition that the electric vehicle needs to be charged, the electric vehicle needs to be connected to a charging pile first. After the charging pile is connected to the electric vehicle, the charging pile sends a charging request to the battery management system, to request to charge the battery pack in the electric vehicle.

After receiving the charging request, the battery management system obtains a threshold value and an initial value of a charging parameter of the battery.

In the embodiment of the present application, the initial value of the charging parameter of the battery refers to a value of the charging parameter of the battery obtained for a first time after the battery management system receives the charging request.

In the embodiment of the present application, the charging parameter may be at least one of a charging state of charge (SOC) and a charging voltage. It should be noted that the charging voltage of the battery refers to a voltage difference between collected voltages at two ends of the battery. The charging SOC of the battery is calculated in real time by a SOC calculation module in the battery management system, and the specific calculation method is not limited here.

In the embodiment of the present application, considering that the aging state of the battery constantly changes as the service time of the electric vehicle increases, the threshold value of the charging parameter is calculated in real time by the battery management system. As an example, the battery management system calculates the threshold value of the charging parameter every preset time interval. After receiving the charging request, the battery management system obtains the latest calculated threshold value of the charging parameter.

The battery charging control method 100 further includes the following step S120.

In S120, under a condition that the initial value of the charging parameter is less than the threshold value of the charging parameter, a control command of charging the battery is sent, so as to charge the battery.

In the embodiment of the present application, under a condition that the initial value of the charging parameter is greater than or equal to the threshold value of the charging parameter, the battery management system sends a control command of no charging to the charging pile, to improve the use safety of the battery and prevent the problems of overcharge or thermal runaway, etc.

Under a condition that the initial value of the charging parameter is less than the threshold value of the charging parameter, it indicates that the battery can be charged, then the battery management system sends the control command of charging the battery to the charging pile. After receiving the control command of charging the battery, the charging pile starts to charge the battery.

The battery charging control method 100 further includes the following steps S130 and S140.

In S130, during the charging of the battery, a value of the charging parameter of the battery is obtained in real time.

In S140, under a condition that the obtained value of the charging parameter of the battery is greater than or equal to the threshold value of the charging parameter, a control command of stopping charging the battery is sent, so as to stop charging.

During the charging of the battery, the battery management system obtains the value of the charging parameter in real time. Each time a value of the charging parameter of the battery is obtained, it is determined whether the obtained value of the charging parameter of the battery is greater than or equal to the threshold value of the charging parameter.

Under a condition that the obtained value of the charging parameter of the battery is less than the threshold value of the charging parameter, the battery management system does not operate, and the charging pile can continue to charge the battery.

Under a condition that the obtained value of the charging parameter of the battery is greater than or equal to the threshold value of the charging parameter, the battery management system sends the control command of stopping charging the battery to the charging pile. After receiving the control command of stopping charging the battery sent by the battery management system, the charging pile stops charging the battery.

In the embodiment of the present application, the threshold value of the charging parameter of the battery is dynamically determined according to the aging state of the battery, that is, according to the actual capacity value of the battery and the accumulated mileage of the electric vehicle where the battery is located, instead of a fixed upper limit of the charging parameter, so the use safety of the battery can be improved by fully considering the current aging state of the battery.

It is worth mentioning that, in some embodiments, as the severity of the aging state of the battery increases, the threshold value of the charging parameter can be reduced to reduce the charge capacity of the battery, so as to extend the safety life of the battery and improve the use safety of the battery. That is, as the actual capacity of the battery and the mileage of the electric vehicle increase, the threshold value of the charging parameter is gradually reduced.

In the embodiment of the present application, before S110, the battery management system calculates the threshold value of the charging parameter in real time. The following describes a specific calculation method of the threshold value of the charging parameter of the battery in detail.

In the embodiment of the present application, before S110, the battery charging control method 100 may further include S101.

In S101, a chargeable capacity upper-limit value of the battery is determined based on the actual capacity value of the battery and the accumulated mileage.

In some embodiments of the present application, S101 may include the following step A1.

In A1, the chargeable capacity upper-limit value of the battery is determined based on the actual capacity value of the battery, the accumulated mileage and a preset third correspondence relationship, wherein the third correspondence relationship is a correspondence relationship between a first capacity and a second parameter, and the second parameter includes a second capacity and a mileage.

In the embodiment of the present application, the battery management system matches the actual capacity value of the battery with each second capacity in the preset third correspondence relationship, to obtain a second capacity matching the actual capacity value of the battery in the correspondence relationship.

The battery management system matches the accumulated mileage of the electric vehicle with each mileage in the preset third correspondence relationship, to obtain a mileage matching the accumulated mileage of the electric vehicle in the correspondence relationship.

Finally, the battery management system uses a first capacity corresponding to both of the second capacity matching the actual capacity value of the battery and the mileage matching the accumulated mileage of the electric vehicle in the third correspondence relationship as the chargeable capacity upper-limit value of the battery.

In the preset third correspondence relationship, under a condition that the second capacity is constant, the higher the mileage is, the smaller the corresponding first capacity is. In the third correspondence relationship, under a condition that the mileage is constant, the lower the second capacity is, the smaller the corresponding first capacity is. That is, as the aging state of the battery becomes gradually serious, the chargeable capacity upper-limit value of the battery can be reduced, so as to avoid overcharging the battery and improve the use safety of the battery.

In some embodiments of the present application, considering that the specification of the battery may be different, in order to improve the applicability of the battery charging control method provided according to the embodiment of the present application, S101 may include the following step A2.

In A2, an actual state of health (SOH) of the battery is determined based on the actual capacity value of the battery.

In the embodiment of the present application, the actual SOH of the battery can be obtained based on the actual capacity value of the battery and a nominal capacity of the battery. A ratio of the actual capacity value of the battery to the nominal capacity of the battery is the actual SOH of the battery.

After A2, S101 may further include the following step A3.

In A3, the chargeable capacity upper-limit value of the battery is determined based on the actual SOH and the accumulated mileage.

In some embodiments of the present application, the chargeable capacity upper-limit value of the battery can be determined based on the actual SOH of the battery, the millage of the electric vehicle and a preset fourth correspondence relationship. The fourth correspondence relationship is a correspondence relationship between a capacity and a third parameter, and the third parameter includes a mileage and a SOH. Table 2 shows a schematic diagram of a preset fourth correspondence relationship provided according to an embodiment of the present application, that is, a correspondence relationship between a capacity, a mileage c and a SOH.

TABLE 2

| SOH (%) | c (km) | | | | |
|---|---|---|---|---|---|
| | <S1 | S1 | S2 | S3 | S4 |
| B1 | E01 | E11 | E21 | E31 | E41 |
| B2 | E02 | E12 | E22 | E32 | E42 |
| B3 | E03 | E13 | E23 | E33 | E43 |
| B4 | E04 | E14 | E24 | E34 | E44 |

The correspondence relationship between the capacity, the mileage c and the SOH can be obtained by an off-line calibration test. As shown in Table 2, each value or value range in the first row of Table 2 represents a different mileage, and Bt in the first column of Table 2 represents a different SOH. t is an integer greater than or equal to 1 and less than or equal to 4. Ejk represents a capacity value, j is an integer greater than or equal to 0, and k is an integer greater than or equal to 1. That is, for any SOH and any c, they together correspond to a capacity value. It should be noted that the number of SOHs and the number of mileages in Table 2 are only schematic, and the number of SOHs and the number of mileages in the fourth correspondence relationship can be adjusted according to actual requirements.

In the preset fourth correspondence relationship, under a condition that the SOH is constant, the higher the mileage is, the smaller the corresponding capacity value is. In the preset fourth correspondence relationship, under a condition that the mileage is constant, the lower the SOH is, the smaller the corresponding capacity value is. That is, as the aging state of the battery becomes gradually serious, the chargeable capacity upper-limit value of the battery can be reduced, so as to avoid overcharging the battery and improve the use safety of the battery.

In some other embodiments, in the preset fourth correspondence relationship, the mileage c may also correspond to a mileage segment.

In the embodiment of the present application, the obtained actual SOH can be matched with each SOH in the fourth correspondence relationship in Table 2, to find a SOH matching the actual SOH of the battery in the correspondence relationship. As an example, under a condition that an absolute value of a difference between the actual SOH of the battery and a certain SOH in the correspondence relationship is less than or equal to a preset SOH difference threshold, it can be considered that the actual SOH of the battery matches the SOH in the correspondence relationship.

Then, the obtained accumulated mileage of the electric vehicle is matched with each mileage in the fourth correspondence relationship in Table 2.

In an example, under a condition that each mileage in the fourth correspondence relationship in Table 2 is a mileage segment, the mileage segment into which the accumulated mileage of the electric vehicle falls is used as the matching mileage. As shown in Table 2, under a condition that S1 is 10000 kilometers and the accumulated mileage of the electric vehicle is 5000 kilometers, the mileage matching the accumulated mileage of the electric vehicle in Table 2 is a mileage segment less than S1.

In another example, under a condition that each mileage in the fourth correspondence relationship in Table 2 is a specific mileage value, the mileage in the correspondence relationship (for the mileage, an absolute value of a difference between the specific mileage value and the accumulated mileage of the electric vehicle is less than a preset mileage difference threshold) is used as the mileage matching the accumulated mileage of the electric vehicle.

In yet another example, under a condition that each mileage in the fourth correspondence relationship in Table 2 is a specific mileage value, two successive mileage values nearest the accumulated mileage of the electric vehicle in the correspondence relationship are used as the mileages matching the accumulated mileage of the electric vehicle. For example, under a condition that S2 is 20000 kilometers, S3 is 30000 kilometers, and the accumulated mileage of the electric vehicle is 25000 kilometers, S2 and S3 are the mileages matching the accumulated mileage of the electric vehicle.

Finally, the chargeable capacity upper-limit value of the battery is obtained based on a capacity value corresponding to both of the SOH matching the actual SOH of the battery and the mileage matching the accumulated mileage of the electric vehicle in the fourth correspondence relationship in Table 2.

In some embodiments of the present application, under a condition that the mileage matching the accumulated mileage of the electric vehicle is a mileage value or a mileage segment, a capacity value corresponding to both of the mileage matching the accumulated mileage of the electric vehicle and the SOH matching the actual SOH of the battery can be used as the chargeable capacity upper-limit value of the battery.

In some embodiments of the present application, under a condition that the mileages matching the accumulated mileage of the electric vehicle are two successive mileage values nearest the mileage value, the chargeable capacity upper-limit value of the battery can be calculated based on the two mileage values and two capacity values respectively corresponding to both of a respective one of the two mileage values and the SOH matching the actual SOH of the battery.

As an example, under a condition that the accumulated mileage S0 of the electric vehicle is greater than S2 and less than S3, the mileages matching the accumulated mileage S0 of the electric vehicle are S2 and S3. The SOH matching the actual SOH of the battery is 90% in Table 2. In Table 2, the capacity value corresponding to both of S2 and 90% is E23, and the capacity value corresponding to both of S3 and 90% is E33. Then the chargeable capacity upper-limit value C0 of the battery can be calculated based on the following formula:

$$C0 = \frac{E33(S0 - S2) + E23(S3 - S0)}{S3 - S2} \quad (1)$$

It should be noted that, in the preset correspondence relationship between the first capacity and the second capacity and the mileage, the mileage can be a value or a mileage segment. Under a condition that the mileages matching the accumulated mileage of the electric vehicle are two successive mileage values nearest the mileage value, the chargeable capacity upper-limit value of the battery is calculated based on the two mileage values and two first capacity values respectively corresponding to both of a respective one of the two mileage values and the second capacity matching the actual capacity value of the battery. The specific calculation method may refer to formula (1). Details are not described herein again.

After S101, the battery charging control method 100 may further include S103.

In S103, the threshold value of the charging parameter of the battery is determined based on the actual capacity value and the chargeable capacity upper-limit value of the battery.

In some embodiments of the present application, the charging parameter is a charging SOC, and correspondingly, the threshold value of the charging parameter includes a charging SOC threshold value.

S103 may include S1301.

In S1301, a ratio of the chargeable capacity upper-limit value to the actual capacity value is used as the charging SOC threshold value of the battery.

Under a condition that the obtained charging SOC of the battery is greater than or equal to the charging SOC threshold value, a control command of stopping charging the battery is sent, to stop charging the battery, so as to improve the safety of the battery.

In some embodiments of the present application, a range of the threshold value of the charging SOC is [30%, 100%].

In some other embodiments of the present application, the charging parameter is a charging voltage, and correspondingly, the threshold value of the charging parameter includes a charging voltage threshold value.

In this case, step S103 not only includes S1301, but also may include S1303.

In S1303, the charging voltage threshold value of the battery is determined based on the charging SOC threshold value, an obtained current temperature of the battery and a first correspondence relationship, wherein the first correspondence relationship is a correspondence relationship between a voltage and a first parameter, and the first parameter includes a temperature and a SOC.

The first correspondence relationship can be obtained by an off-line calibration test during normal charging of the battery.

As an example, Table 3 shows a schematic diagram of a preset first correspondence relationship provided according to an embodiment of the present application.

TABLE 3

| Temperature | SOC | | | |
| --- | --- | --- | --- | --- |
| | C1 | C2 | C3 | C4 |
| T1 | $A_1$ | $A_2$ | $A_3$ | $A_4$ |
| T2 | $A_5$ | $A_6$ | $A_7$ | $A_8$ |
| T3 | $A_9$ | $A_{10}$ | $A_{11}$ | $A_{12}$ |
| T4 | $A_{13}$ | $A_{14}$ | $A_{15}$ | $A_{16}$ |
| T5 | $A_{17}$ | $A_{18}$ | $A_{19}$ | $A_{20}$ |

As shown in Table 3, Cq in the first row of Table 3 is a different SOC, and q is an integer greater than or equal to 1 and less than or equal to 4. Tp in the first column of Table 3 represents a different temperature, and p is an integer greater than or equal to 1 and less than or equal to 5. Ah in Table 3 represents a different voltage value, and h is an integer greater than or equal to 1. For any SOC and any temperature, they together correspond to a voltage value. It should be noted that the number of SOCs and the number of temperatures in Table 3 are only schematic, and the number of SOCs and the number of temperatures in the first correspondence relationship can be adjusted according to actual requirements.

In the first correspondence relationship, under a condition that the temperature is constant, the voltage gradually decreases as the SOC decreases, thereby reducing the charging cut-off voltage of the battery as the degree of aging becomes serious, such that the use safety of the battery is improved.

As an example, under a condition that the battery is a high-nickel ternary lithium-ion positive electrode material (NCM) battery, the range of each voltage value in Table 3 is [3.6V, 4.3V].

After the charging SOC threshold value of the battery is obtained, the charging SOC threshold value is matched with each SOC in the correspondence relationship in Table 3, to find a SOC matching the charging SOC threshold value in the correspondence relationship in Table 3. As an example, in the preset first correspondence relationship, the SOC (for the SOC, an absolute value of a difference between the SOC and the charging SOC threshold value is less than or equal to the preset SOC threshold value) can be the SOC matching the charging SOC threshold value.

After the current temperature of the battery is obtained, the current temperature of the battery is matched with each temperature in the correspondence relationship in Table 3, to find a temperature matching the current temperature of the battery in the correspondence relationship in Table 3. As an example, in the preset first correspondence relationship, the temperature (for the temperature, a difference between the temperature the current temperature of the battery is less than or equal to the preset temperature threshold value) can be the temperature matching the current temperature of the battery.

Next, a voltage value corresponding to both of the temperature matching the current temperature of the battery and the SOC matching the charging SOC threshold value in Table 3 is used as the charging cut-off voltage of the battery.

Under a condition that the obtained charging voltage of the battery is greater than or equal to the charging voltage threshold value, a control command of stopping charging the battery is sent to improve the use safety of the battery and prolong the service life of the battery.

In still some other embodiments of the present application, the charging parameter includes a charging voltage and a charging SOC, and correspondingly, the threshold value of the charging parameter includes a charging SOC threshold value and a charging voltage threshold value.

In this case, S103 may also include S1031 to S1303, the specific implementation can be referred to the above description, and details are not described herein again.

Under this application scenario, under a condition that the obtained charging voltage of the battery is greater than or equal to the charging voltage threshold value and the obtained charging SOC is greater than or equal to the charging SOC threshold value, a control command of stopping charging the battery is sent to improve the use safety of the battery and prolong the service life of the battery.

Taking a battery with a nominal capacity of 100 Ah and an operating vehicle warranty of 300000 kilometers in 3 years as an example, the specific implementation process of the battery charging control method provided according to the embodiments of the present application is described below.

Under a condition that the accumulated charge capacity of the battery from the factory until now is 150000 Ah, it can be determined that the actual capacity of the battery is 70 Ah based on a preset correspondence relationship between a charge capacity and an actual capacity. Based on the actual capacity value of the battery and the nominal capacity of the battery, it can be obtained that the actual SOH of the battery is 70%.

Under a condition that the accumulated mileage of the electric vehicle is 350000 kilometers, it can be determined that the chargeable capacity upper-limit value of the battery is 55 Ah based on a preset correspondence relationship between a capacity value and a mileage and SOH.

Based on the actual SOH of the battery and the chargeable capacity upper-limit value of the battery, it can be calculated that the charging SOC threshold value of the battery is equal to 55 Ah/70 Ah=78.6%.

In some exemplary embodiments, it can be determined that the charging voltage threshold value of the battery is 3.9 V based on the charging SOC threshold value of the battery, the current temperature of the battery, and the preset first correspondence relationship.

During charging of the battery, under a condition that the SOC calculated by a SOC module reaches the charging SOC threshold value 78.6%, and/or the voltage of the battery reaches 3.9 V, the charging of the battery is stopped.

In the embodiment of the present application, from the time the battery leaves the factory to the final life of the battery, as the aging state of the battery becomes gradually serious, in order to improve the use safety of the battery, the charging SOC threshold value of the battery shows a gradual decrease trend, and the charging cut-off voltage of the battery also shows a gradual decrease trend.

Figure 2:
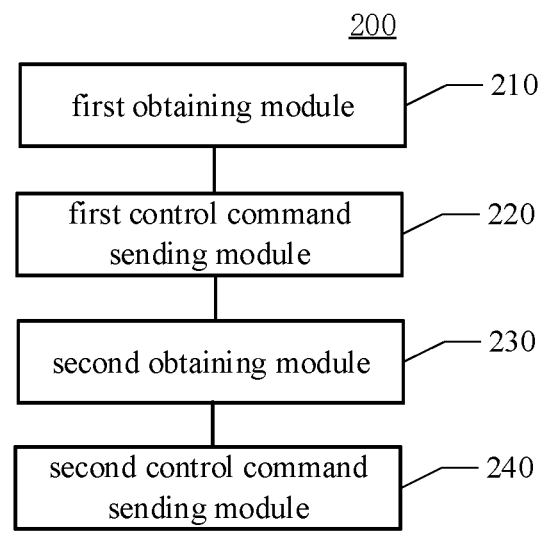
FIG. 2 illustrates a schematic structural diagram of an embodiment of a battery charging control apparatus provided according to the present application.

FIG. 2 shows a schematic structural diagram of a battery charging control apparatus provided according to an embodiment of the present application. As shown in FIG. 2, the battery charging control apparatus 200 includes:

a first obtaining module 210 configured to obtain, based on a received charging request, a threshold value and an initial value of a charging parameter of a battery, wherein the threshold value of the charging parameter is determined based on an actual capacity value of the battery and an accumulated mileage of an electric vehicle where the battery is located;

a first control command sending module 220 configured to send, under a condition that the initial value of the charging parameter is less than the threshold value of the charging parameter, a control command of charging the battery, so as to charge the battery;

a second obtaining module 230 configured to obtain a value of the charging parameter of the battery in real time during the charging of the battery; and a second control command sending module 240 configured to send, under a condition that the obtained value of the charging parameter of the battery is greater than or equal to the threshold value of the charging parameter, a control command of stopping charging the battery, so as to stop charging.

In the embodiment of the present application, the battery charging control apparatus 200 may further include:

a chargeable capacity upper-limit value determination module configured to determine a chargeable capacity upper-limit value of the battery based on the actual capacity value of the battery and the accumulated mileage; and a charging parameter threshold value determination module configured to determine the threshold value of the charging parameter based on the actual capacity value and the chargeable capacity upper-limit value.

In the embodiment of the present application, the charging parameter may be a state of charge (SOC), and correspondingly, the threshold value of the charging parameter includes a charging SOC threshold value, then the charging parameter threshold value determination module is configured to use a ratio of the chargeable capacity upper-limit value to the actual capacity value as the charging SOC threshold value of the battery.

In the embodiment of the present application, the charging parameter may be a charging voltage, and correspondingly, the threshold value of the charging parameter includes a charging voltage threshold value, then the charging parameter threshold value determination module can be configured to:

use a ratio of the chargeable capacity upper-limit value to the actual capacity value as a charging SOC threshold value of the battery; and determine the charging voltage threshold value of the battery based on the charging SOC threshold value, an obtained current temperature of the battery and a preset first correspondence relationship, wherein the first correspondence relationship is a correspondence relationship between a voltage and a first parameter, and the first parameter includes a temperature and a SOC.

In the embodiment of the present application, the charging parameter includes a charging voltage and a charging SOC, and correspondingly, the threshold of the charging parameter may include a charging SOC threshold value and a charging voltage threshold value, then the charging parameter threshold value determination module can be configured to:

use a ratio of the chargeable capacity upper-limit value to the actual capacity value as the charging SOC threshold value of the battery; and determine the charging voltage threshold value of the battery based on the charging SOC threshold value, an obtained current temperature of the battery and a preset first correspondence relationship, wherein the first correspondence relationship is a correspondence relationship between a voltage and a first parameter, and the first parameter includes a temperature and a SOC.

In the embodiment of the present application, the actual capacity value can be determined based on an accumulated charge/discharge capacity value of the battery, and the accumulated charge/discharge capacity value of the battery may be any one of:

an accumulated converted charge capacity value of the battery, an accumulated converted discharge capacity value of the battery, and a sum of the accumulated converted charge capacity value of the battery and the accumulated converted discharge capacity value of the battery;

wherein the converted charge capacity value of the battery is a product of a charge capacity value of the battery and a conversion coefficient corresponding to a charging temperature of the battery, and the converted discharge capacity value of the battery is a product of a discharge capacity value of the battery and a conversion coefficient corresponding to a discharging temperature of the battery;

wherein the conversion coefficient corresponding to the charging temperature of the battery is determined based on the charging temperature of the battery and a preset correspondence relationship between a temperature and the conversion coefficient, and the conversion coefficient corresponding to the discharging temperature of the battery is determined based on the discharging temperature of the battery and a preset correspondence relationship between a temperature and the conversion coefficient.

In the embodiment of the present application, the actual capacity value is determined based on the accumulated mileage and a preset second correspondence relationship, wherein the second correspondence relationship is a correspondence relationship between a mileage and a capacity.

In the embodiment of the present application, the chargeable capacity upper-limit value determination module can be configured to:

determine the chargeable capacity upper-limit value of the battery based on the actual capacity value of the battery, the accumulated mileage, and a preset third correspondence relationship, wherein the third correspondence relationship is a correspondence relationship between a first capacity and a second parameter, and the second parameter includes a second capacity and a mileage.

In the embodiment of the present application, the chargeable capacity upper-limit value determination module may include:

an actual SOH determination unit configured to determine an actual state of health (SOH) of the battery based on the actual capacity value of the battery; and a chargeable capacity upper-limit value determination unit configured to determine the chargeable capacity upper-limit value of the battery based on the actual SOH and the accumulated mileage.

In the embodiment of the present application, the chargeable capacity upper-limit value determination unit can be configured to:

determine the chargeable capacity upper-limit value of the battery based on the actual SOH, the accumulated mileage and a preset fourth correspondence relationship, wherein the fourth correspondence relationship is a correspondence relationship between a capacity and a third parameter, and the third parameter includes a mileage and a SOH.

In the embodiment of the present application, a threshold value of a charging parameter of a battery is dynamically determined based on an actual capacity value of the battery and an accumulated mileage of an electric vehicle where the battery is located, which implement dynamic calculation of the threshold value of the charging parameter according to an aging state of the battery. During charging of the battery, under a condition that the obtained value of the charging parameter of the battery is greater than the latest calculated threshold value of the charging parameter, the charging of the battery is stopped. By determining the threshold value of the charging parameter of the battery in consideration with the aging state of the battery, the use safety of the battery is improved.

Other details of the battery charging control apparatus according to the embodiment of the present application are similar to those of the method according to the embodiment of the present application described above in conjunction with FIG. 1, and will not be repeated here.

Figure 3:
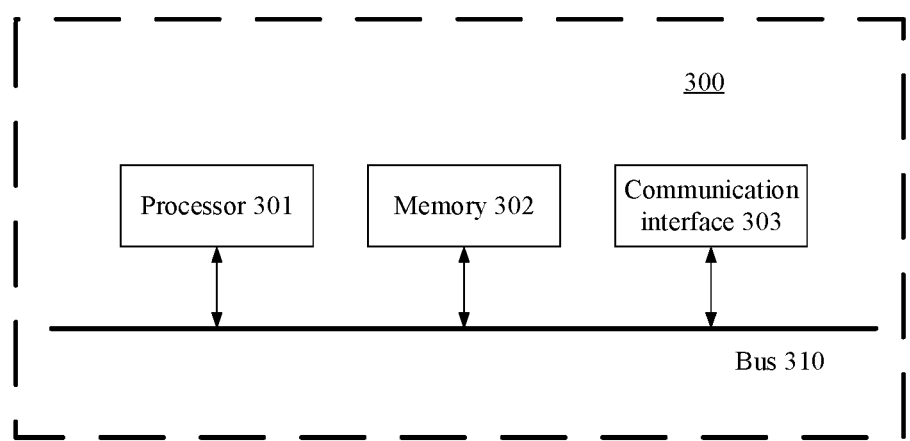
FIG. 3 illustrates a schematic structural diagram of an embodiment of a battery management system provided according to the present application.

The battery charging control method and apparatus according to the embodiments of the present application described in conjunction with FIGS. 1 to 2 can be implemented by a battery management system for a battery. FIG. 3 is a schematic diagram showing a hardware structure 300 of a battery management system according to an embodiment of the invention.

As shown in FIG. 3, the battery management system 300 in this embodiment includes a processor 301, a memory 302, a communication interface 303, and a bus 310. The processor 301, the memory 302, and the communication interface 303 are connected by the bus 310 and complete communication with each other.

Specifically, the processor 301 may include a central processing unit (CPU) or an application specific integrated circuit (ASIC), or may be configured to implement one or more integrated circuits according to the embodiments of the present application.

The memory 302 may include a mass memory for data or instructions. By way of example and without limitation, the memory 302 may include a hard disk drive (HDD), a floppy disk drive, a flash memory, an optical disk, a magneto-optical disk, a magnetic tape, or a universal serial bus (USB) drive, or a combination of two or more thereof. Where appropriate, the memory 302 may include removable or non-removable (or fixed) media. Where appropriate, the memory 302 may be internal or external to the battery management system 300. In a particular embodiment, the memory 302 is a non-volatile solid state memory. In a particular embodiment, the memory 302 includes a read-only memory (ROM). Where appropriate, the ROM may be a mask-programmed ROM, a programmable ROM (PROM), an erasable PROM (EPROM), an electrically erasable PROM (EEPROM), an electrically alterable ROM (EAROM), or a flash memory, or a combination of two or more thereof.

The communication interface 303 is mainly configured to implement communication between various modules, apparatuses, units, and/or devices in the embodiments of the present application.

The bus 310 includes hardware, software, or both, and couples the components of the battery management system 300 together. By way of example and without limitation, the bus may include an accelerated graphics port (AGP), or other graphics bus, enhanced industry standard architecture (EISA) bus, front side bus (FSB), hypertransport (HT) interconnect, industry standard architecture (ISA) bus, infinite bandwidth interconnect, low pin count (LPC) bus, memory bus, micro channel architecture (MCA) bus, peripheral component interconnect (PCI) bus, PCI-Express (PCI-X) bus, serial advanced technology attachment (SATA) bus, video electronics standards association local (VLB) bus, or other suitable bus, or a combination of two or more thereof. Where appropriate, the bus 310 may include one or more buses. Although the embodiment of the present application describes and shows a specific bus, the present application considers any suitable bus or interconnect.

That is, the battery management system 300 shown in FIG. 3 may be implemented as including a processor 301, a memory 302, a communication interface 303, and a bus 310. The processor 301, the memory 302, and the communication interface 303 are connected by the bus 310 and complete communication with each other. The memory 302 is configured to store program codes; the processor 301 runs a program corresponding to the executable program codes by reading the executable program codes stored in the memory 302, to execute the battery charging control method in any embodiment of the present application, so as to implement the battery charging control method and apparatus described in conjunction with FIG. 1 and FIG. 2.

An embodiment of the present application further provides a computer storage medium having computer program instructions stored thereon, wherein the computer program instructions, when executed by a processor, implement the battery charging control method according to any embodiment of the present application. Examples of the computer storage medium include non-transitory computer storage media, such as an electronic circuit, a semiconductor memory device, an ROM, a flash memory, an erasable ROM (EROM), a floppy disk, a CD-ROM, an optical disk, and a hard disk.

It should be clear that the present application is not limited to the specific configuration and processing described above and shown in the figures. For the sake of brevity, detailed descriptions of known methods are omitted here. In the above embodiments, a plurality of specific steps are described and shown as examples. However, the method process of the present application is not limited to the specific steps described and shown. After understanding the spirit of the present application, a person skilled in the art can make various changes, modifications and additions, or change the order between the steps.

The functional blocks shown in the above structural block diagram can be implemented as hardware, software, firmware, or a combination thereof. When implemented in hardware, the functional blocks can be, for example, an electronic circuit, an application-specific integrated circuit (ASIC), appropriate firmware, plug-ins, function cards, etc. When implemented in software, the elements of the present application are programs or code segments used to perform required tasks. The programs or code segments can be stored in a machine-readable medium, or transmitted over a transmission medium or communication link through data signals carried in carrier waves. The "machine-readable medium" may include any medium that can store or transmit information. Examples of the machine-readable medium include an electronic circuit, a semiconductor memory device, an ROM, a flash memory, an erasable ROM (EROM), a floppy disk, a CD-ROM, an optical disk, a hard disk, an optical fiber medium, a radio frequency (RF) link, etc. The code segments can be downloaded via a computer network such as the Internet and Intranet. These programs or code segments can be provided to a processor of a general-purpose computer, a special-purpose computer, or other programmable data processing device, to produce a machine that enables instructions executed by the processor of the computer or other programmable data processing device to implement the functions/operations specified in one or more blocks of the flowcharts and/or block diagrams. Such a processor may be, but not limited to, a general-purpose processor, a dedicated processor, a special application processor, or a field programmable logic circuit.

It should be noted that the exemplary embodiments mentioned in the present invention describe some methods or systems based on a series of steps or devices. However, the present invention is not limited to the order of the above steps, that is, the steps may be performed in the order mentioned in the embodiment or in an order different from that in the embodiment, or several steps may be performed at the same time.

Described above are merely specific embodiments of the present application. A skilled person in the art can clearly understand that, for the sake of convenience and briefness in description, the specific working processes of the above-described systems, modules and units may refer to the corresponding processes in the embodiments of the aforementioned methods, and details are not described herein again. It should be understood that the protection scope of the present invention is not limited thereto. A skilled person in the art can readily conceive various equivalent modifications or replacements within the technical scope disclosed by the present invention, and these modifications or replacements shall fall within the protection scope of the present invention.

What is claimed is:

1. A battery charging control method, comprising:
    obtaining, based on a received charging request, a threshold value and an initial value of a charging parameter of a battery, wherein the threshold value of the charging parameter is determined based on an actual capacity value of the battery and an accumulated mileage of an electric vehicle where the battery is located;
    sending, under a condition that the initial value of the charging parameter is less than the threshold value of the charging parameter, a control command of charging the battery, so as to charge the battery;
    obtaining a value of the charging parameter of the battery in real time during the charging of the battery;
    sending, under a condition that the obtained value of the charging parameter of the battery is greater than or equal to the threshold value of the charging parameter, a control command of stopping charging the battery, so as to stop charging.

2. The method according to claim 1, wherein the actual capacity value is determined based on an accumulated charge/discharge capacity value of the battery,
    the accumulated charge/discharge capacity value of the battery is any one of:
    an accumulated converted charge capacity value of the battery, an accumulated converted discharge capacity value of the battery, and a sum of the accumulated converted charge capacity value of the battery and the accumulated converted discharge capacity value of the battery,
    the converted charge capacity value of the battery is a product of a charge capacity value of the battery and a conversion coefficient corresponding to a charging temperature of the battery, and the conversion coefficient corresponding to the charging temperature of the battery is determined based on the charging temperature of the battery and a preset correspondence relationship between a temperature and the conversion coefficient;
    the converted discharge capacity value of the battery is a product of a discharge capacity value of the battery and a conversion coefficient corresponding to a discharging temperature of the battery, and the conversion coefficient corresponding to the discharging temperature of the battery is determined based on the discharging temperature of the battery and the preset correspondence relationship between the temperature and the conversion coefficient.

3. The method according to claim 1, wherein the actual capacity value is determined based on the accumulated mileage and a preset first correspondence relationship,
    the first correspondence relationship is a correspondence relationship between a mileage and a capacity.

4. A battery management system, comprising: a processor and a non-transitory memory storing computer program instructions,
    wherein the processor, when executes the computer program instructions, implements the battery charging control method according to claim 1.

5. A non-transitory computer storage medium having computer program instructions stored thereon, wherein the computer program instructions, when executed by a processor, implement the battery charging control method according to claim 1.

6. The method according to claim 1, wherein before obtaining, based on a received charging request, a threshold value and an initial value of a charging parameter of a battery, the method further comprises:
    determining a chargeable capacity upper-limit value of the battery based on the actual capacity value of the battery and the accumulated mileage;
    determining the threshold value of the charging parameter based on the actual capacity value and the chargeable capacity upper-limit value.

7. The method according to claim 6, wherein the charging parameter is a charging state of charge (SOC), and the threshold value of the charging parameter comprises a charging SOC threshold value;
    wherein determining the threshold value of the charging parameter based on the actual capacity value and the chargeable capacity upper-limit value comprises:
    using a ratio of the chargeable capacity upper-limit value to the actual capacity value as the charging SOC threshold value of the battery.

8. The method according to claim 6, wherein the charging parameter is a charging voltage, and correspondingly, the threshold value of the charging parameter comprises a charging voltage threshold value;
    wherein determining the threshold value of the charging parameter based on the actual capacity value and the chargeable capacity upper-limit value comprises:
    using a ratio of the chargeable capacity upper-limit value to the actual capacity value as a charging SOC threshold value of the battery;
    determining the charging voltage threshold value of the battery based on the charging SOC threshold value, an obtained current temperature of the battery, and a preset first correspondence relationship,
    wherein the first correspondence relationship is a correspondence relationship between a voltage and a first parameter, and the first parameter comprises a temperature and a SOC.

9. The method according to claim 6, wherein the charging parameter comprises a charging voltage and a charging SOC, and the threshold value of the charging parameter comprises a charging SOC threshold value and a charging voltage threshold value;
    wherein determining the threshold value of the charging parameter based on the actual capacity value and the chargeable capacity upper-limit value comprises:
    using a ratio of the chargeable capacity upper-limit value to the actual capacity value as the charging SOC threshold value of the battery;
    determining the charging voltage threshold value of the battery based on the charging SOC threshold value, an obtained current temperature of the battery, and a preset first correspondence relationship,
    wherein the first correspondence relationship is a correspondence relationship between a voltage and a first parameter, and the first parameter comprises a temperature and a SOC.

10. The method according to claim 6, wherein determining a chargeable capacity upper-limit value of the battery based on the actual capacity value of the battery and the accumulated mileage comprises:
    determining the chargeable capacity upper-limit value of the battery based on the actual capacity value of the battery, the accumulated mileage, and a preset first correspondence relationship,
    wherein the first correspondence relationship is a correspondence relationship between a first capacity and a first parameter, and the first parameter comprises a second capacity and a mileage.

11. The method according to claim 6, wherein determining a chargeable capacity upper-limit value of the battery based on the actual capacity value of the battery and the accumulated mileage comprises:
    determining an actual state of health (SOH) of the battery based on the actual capacity value of the battery;
    determining the chargeable capacity upper-limit value of the battery based on the actual SOH and the accumulated mileage.

12. The method according to claim 11, wherein determining the chargeable capacity upper-limit value of the battery based on the actual SOH and the accumulated mileage comprises:
    determining the chargeable capacity upper-limit value of the battery based on the actual SOH, the accumulated mileage, and a preset first correspondence relationship,
    wherein the first correspondence relationship is a correspondence relationship between a capacity and a first parameter, and the first parameter comprises a mileage and a SOH.

13. A battery charging control apparatus, comprising:
    a first obtaining module configured to obtain, based on a received charging request, a threshold value and an initial value of a charging parameter of a battery, wherein the threshold value of the charging parameter is determined based on an actual capacity value of the battery and an accumulated mileage of an electric vehicle where the battery is located;
    a first control command sending module configured to send, under a condition that the initial value of the charging parameter is less than the threshold value of the charging parameter, a control command of charging the battery, so as to charge the battery;
    a second obtaining module configured to obtain a value of the charging parameter of the battery in real time during the charging of the battery;
    a second control command sending module configured to send, under a condition that the obtained value of the charging parameter of the battery is greater than or equal to the threshold value of the charging parameter, a control command of stopping charging the battery, so as to stop charging.

\* \* \* \* \*